United States Patent
Handa

(10) Patent No.: US 9,680,881 B2
(45) Date of Patent: Jun. 13, 2017

(54) TRANSMISSION APPARATUS, RECEIVING APPARATUS, TRANSMISSION METHOD, RECEIVING METHOD, AND STORAGE MEDIUM FOR TRANSMITTING AND/OR RECEIVING METADATA INDICATING ADDRESS INFORMATION FOR EACH OF A PLURALITY OF SEGMENTS CORRESPONDING TO DIVIDED CONTENT

(71) Applicant: CANON KABUSHIKI KAISHA, Tokyo (JP)

(72) Inventor: Masahiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 14/077,765

(22) Filed: Nov. 12, 2013

(65) Prior Publication Data

US 2014/0136661 A1 May 15, 2014

(30) Foreign Application Priority Data

Nov. 14, 2012 (JP) .................................. 2012-250187

(51) Int. Cl.
*G06F 15/16* (2006.01)
*H04L 29/06* (2006.01)

(52) U.S. Cl.
CPC ...... *H04L 65/1069* (2013.01); *H04L 65/4084* (2013.01); *H04L 65/4092* (2013.01)

(58) Field of Classification Search
CPC ........................... H04L 67/28; G06F 17/30864
USPC .................................................. 709/219, 227
See application file for complete search history.

(56) References Cited

U.S. PATENT DOCUMENTS

| | | | | |
|---|---|---|---|---|
| 7,743,399 B1* | 6/2010 | Bhagavath | ........... | H04N 21/235 725/86 |
| 2002/0170068 A1* | 11/2002 | Rafey | ............... | G06F 17/30823 725/112 |
| 2008/0040642 A1* | 2/2008 | Furukawa | ............. | G06F 11/327 714/746 |
| 2008/0155627 A1* | 6/2008 | O'Connor | .............. | H04N 7/173 725/109 |
| 2011/0119394 A1 | 5/2011 | Wang | | |
| 2011/0134453 A1* | 6/2011 | Sakiyama | ......... | G06F 17/30861 358/1.13 |
| 2012/0011225 A1 | 1/2012 | Keum | | |

FOREIGN PATENT DOCUMENTS

| | | | |
|---|---|---|---|
| JP | 2012-514276 | * | 6/2012 |
| JP | 2012-514276 A | | 6/2012 |

* cited by examiner

*Primary Examiner* — David Lazaro
*Assistant Examiner* — Marie Georges Henry
(74) *Attorney, Agent, or Firm* — Canon U.S.A., Inc. IP Division

(57) ABSTRACT

A transmission apparatus configured to transmit, to a receiving apparatus, metadata indicating segment data that the receiving apparatus is allowed to acquire among a plurality of segment data constituting content includes a receiving unit configured to receive, from the receiving apparatus, a request for acquisition of the metadata and an end instruction to end a state in which transmission of the segment data to the receiving apparatus is allowed, and a transmission unit configured to transmit, when the receiving unit receives the end instruction, the metadata containing termination information indicating termination of transmission of the segment data to the receiving apparatus.

15 Claims, 11 Drawing Sheets

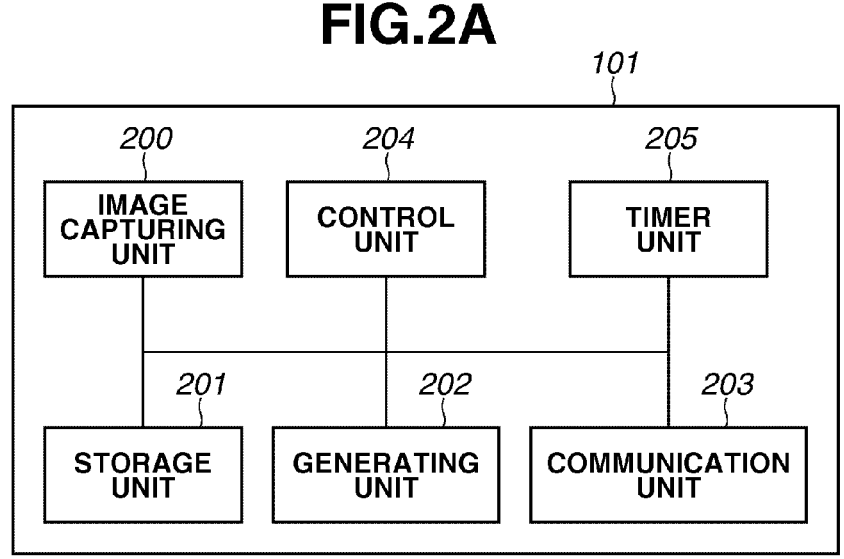
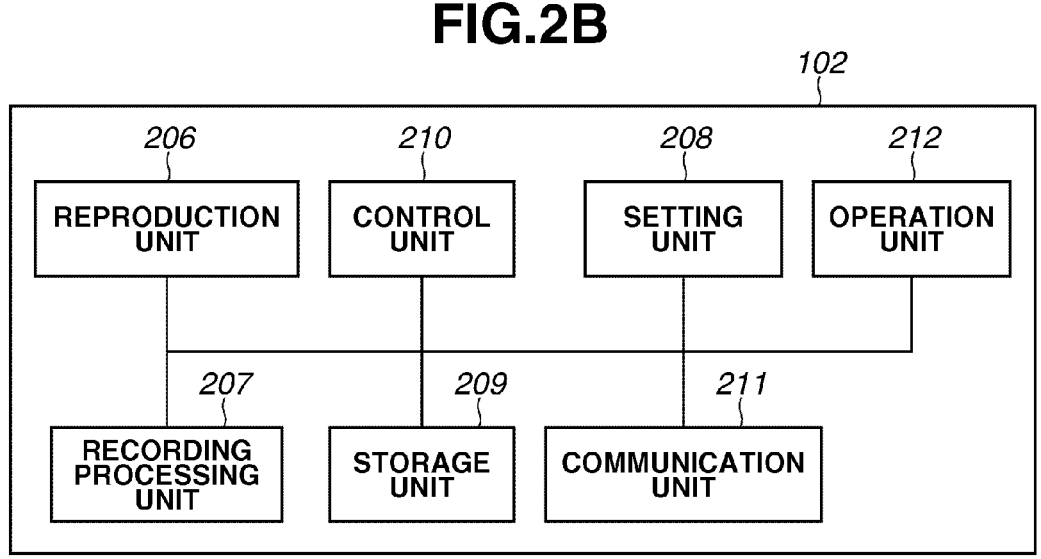

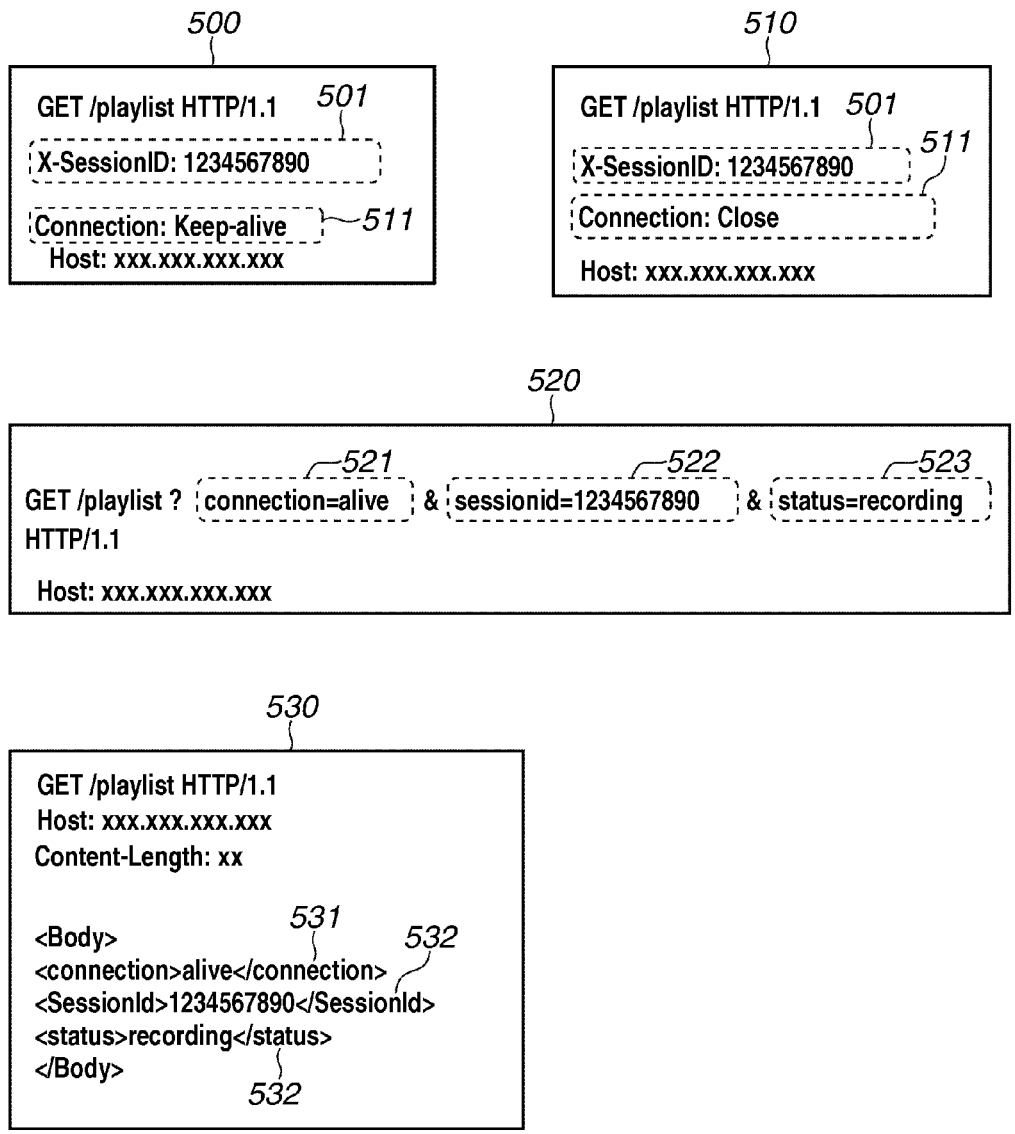

FIG.9

| PLAYLIST ACQUISITION REQUEST | DISTRIBUTED CONTENT | RECORDING MODE OF RECEIVING APPARATUS | PLAYLIST | | SESSION |
|---|---|---|---|---|---|
| | | | ACQUISITION INFORMATION | TERMINATION INFORMATION | |
| NO END INSTRUCTION CONTAINED | LIVE DATA/ RECORDED DATA | RECORDING MODE/ NON-RECORDING MODE | CONTAINED | NOT CONTAINED | CONTINUE |
| END INSTRUCTION CONTAINED | LIVE DATA | NON-RECORDING MODE | NOT CONTAINED | CONTAINED | RELEASE |
| | | RECORDING MODE | CONTAINED | CONTAINED | ACTIVATE TIMER UNIT |
| | RECORDED DATA | RECORDING MODE/ NON-RECORDING MODE | CONTAINED | CONTAINED | ACTIVATE TIMER UNIT (NEW SESSION CAN BE ESTABLISHED) |

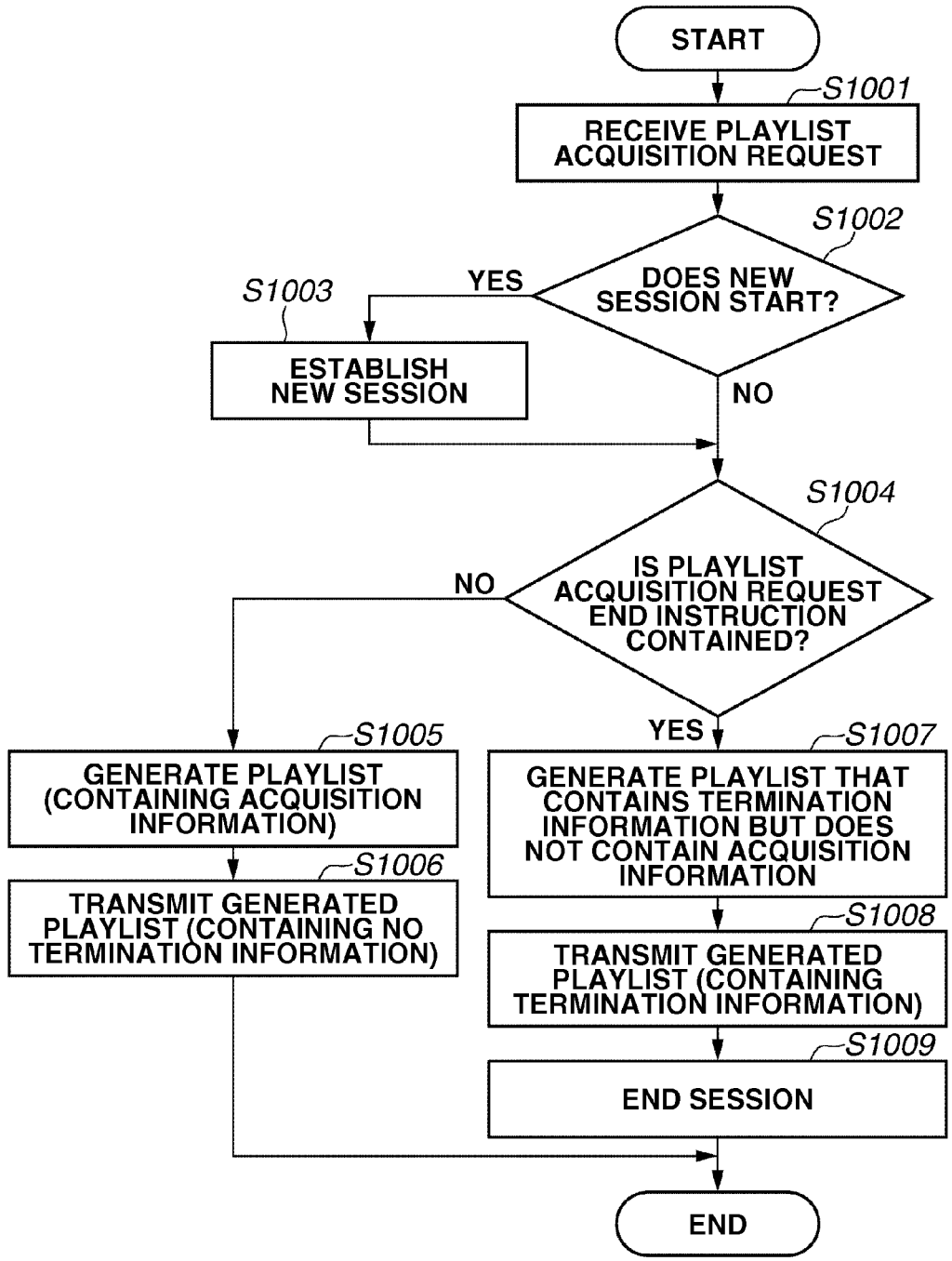

FIG.11

| PLAYLIST ACQUISITION REQUEST | PLAYLIST | | SESSION |
| --- | --- | --- | --- |
| | ACQUISITION INFORMATION | TERMINATION INFORMATION | |
| NO END INSTRUCTION CONTAINED | CONTAINED | NOT CONTAINED | CONTINUE |
| END INSTRUCTION CONTAINED | NOT CONTAINED | CONTAINED | RELEASE |

TRANSMISSION APPARATUS, RECEIVING APPARATUS, TRANSMISSION METHOD, RECEIVING METHOD, AND STORAGE MEDIUM FOR TRANSMITTING AND/OR RECEIVING METADATA INDICATING ADDRESS INFORMATION FOR EACH OF A PLURALITY OF SEGMENTS CORRESPONDING TO DIVIDED CONTENT

BACKGROUND OF THE INVENTION

Field of the Invention

The present invention relates to techniques that allow transmission of a plurality of segment data components constituting video data from a transmission apparatus to a receiving apparatus. In particular, the present invention relates to techniques that allow a transmission apparatus to transmit to a receiving apparatus metadata to be used by the receiving apparatus to acquire the segment data component from the transmission apparatus.

Description of the Related Art

In recent years, transmission systems have been provided that allow real-time transmission of streaming content including audio data, video data and the like to users. Such transmission systems enable users to view desired content such as live video in real time via their terminal apparatuses.

Japanese Unexamined Patent Application Publication No. 2012-514276 discusses a transmission system that allows real-time or near real-time streaming of content by use of transfer protocols such as a hypertext transfer protocol (HTTP)-compliant protocol.

A transmission apparatus discussed in Japanese Unexamined Patent Application Publication No. 2012-514276 divides video data into a plurality of segment data and provides a receiving apparatus with metadata (a playlist) containing reproduction order information and location information on each segment data. Based on the reproduction order information and the location information on the segment data indicated in the acquired playlist, the receiving apparatus acquires the segment data to reproduce the segment data. By this way, the transmission system discussed in Japanese Unexamined Patent Application Publication No. 2012-514276 realizes real-time reproduction of video data.

When the receiving apparatus discussed in Japanese Unexamined Patent Application Publication No. 2012-514276 receives the playlist transmitted from the transmission apparatus with termination information (an end tag), the receiving apparatus acquires from the transmission apparatus segment data corresponding to the received playlist and then ends the streaming. In other words, in the transmission system discussed in Japanese Unexamined Patent Application Publication No. 2012-514276, the transmission apparatus notifies the receiving apparatus of the end of streaming to end the transmission of content.

However, the method discussed in Japanese Unexamined Patent Application Publication No. 2012-514276 cannot allow a user of the receiving apparatus to end the streaming at a desired timing.

Conventionally, as mentioned above, no discussion has been made regarding a transmission system for transmitting a plurality of segment data constituting content to a receiving apparatus in which streaming is ended in response to an instruction from the receiving apparatus to end the streaming.

SUMMARY OF THE INVENTION

The present invention is directed to transmission apparatuses, receiving apparatuses, transmission methods, and storage media that enable a receiving apparatus to end transmission of content at a desired timing in a transmission system in which a transmission apparatus transmits a plurality of segment data constituting content to the receiving apparatus.

According to an aspect of the present invention, a transmission apparatus configured to transmit, to a receiving apparatus, metadata indicating segment data that the receiving apparatus is allowed to acquire among a plurality of segment data constituting content includes a receiving unit configured to receive, from the receiving apparatus, a request for acquisition of the metadata and an end instruction to end a state in which transmission of the segment data to the receiving apparatus is allowed, and a transmission unit configured to transmit, when the receiving unit receives the end instruction, the metadata containing termination information indicating termination of transmission of the segment data to the receiving apparatus.

According to another aspect of the present invention, a receiving apparatus configured to receive metadata indicating segment data that a transmission apparatus is allowed to transmit among a plurality of segment data constituting content includes a transmission unit configured to transmit, to the transmission apparatus, a request for acquisition of the metadata and an end instruction to end a state in which transmission of the segment data to the receiving apparatus is allowed, and a receiving unit configured to receive, in response to the end instruction, the metadata containing termination information indicating termination of transmission of the segment data to the receiving apparatus.

Further features of the present invention will become apparent from the following description of exemplary embodiments with reference to the attached drawings.

BRIEF DESCRIPTION OF THE DRAWINGS

FIGS. 2A and 2B are functional block diagrams respectively illustrating a transmission apparatus and a receiving apparatus according to the first exemplary embodiment.

FIG. 5 is a diagram illustrating examples of a playlist acquisition request message.

FIG. 9 is a diagram illustrating playlist acquisition requests and corresponding playlists to be transmitted according to the first exemplary embodiment.

FIG. 10 is a flow diagram illustrating content transmission processing according to a second exemplary embodiment.

FIG. 11 is a diagram illustrating playlist acquisition requests and corresponding playlists to be transmitted according to the second exemplary embodiment.

DESCRIPTION OF THE EMBODIMENTS

Figure 1:
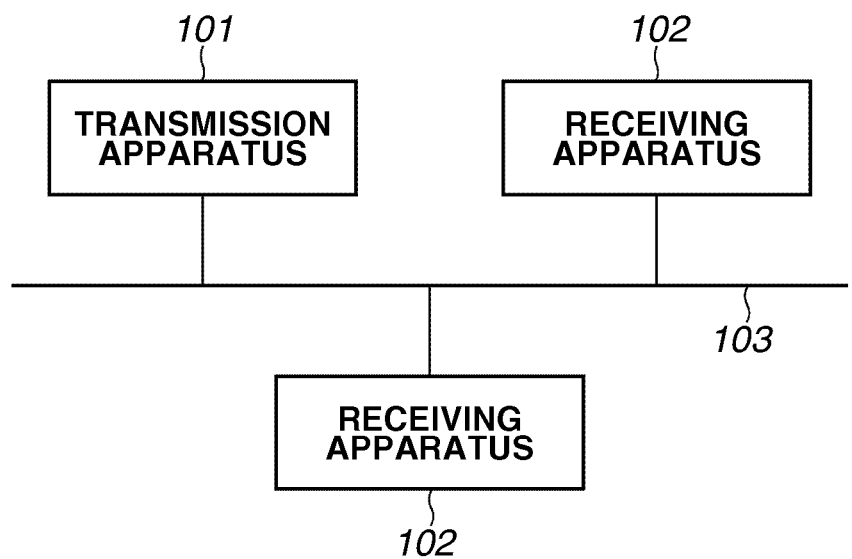
FIG. 1 is a configuration diagram illustrating a transmission system according to a first exemplary embodiment.

Various exemplary embodiments, features, and aspects of the invention will be described in detail below with reference to the drawings.

The following describes a first exemplary embodiment.

An overall configuration of a transmission system according to the first exemplary embodiment of the present invention will be described below with reference to FIG. 1. In the transmission system according to the present exemplary embodiment, a transmission apparatus 101 and a receiving apparatus 102 are connected via a network 103.

The network 103 may include, for example, the Internet, a wired local area network (LAN), a wireless LAN, a wide area network (WAN), and the like. The communication standard, size, and configuration of the network 103 are not particularly limited. The network 103 may be an ad hoc network, an ultra wide band (UWB), and the like. As to the communication standard of the network 103, for example, Ethernet, Bluetooth (registered trademark), Zigbee (registered trademark), and the like may be used.

The transmission apparatus 101 transmits content (video data, audio data, metadata, etc.) to the receiving apparatus 102. The present exemplary embodiment will describe a case in which the transmission apparatus 101 transmits video data to the receiving apparatus 102. Specific examples of the transmission apparatus 101 include cameras, video cameras, tablet apparatuses, personal computers (PCs), mobile phones, etc. The transmission apparatus 101, however, is not limited to the above-specified examples. Content may be generated in the transmission apparatus 101, or content generated in a different content generation apparatus or the like may be used.

The receiving apparatus 102 receives content from the transmission apparatus 101. In the present exemplary embodiment, the receiving apparatus 102 also functions to reproduce the received content. Alternatively, the receiving apparatus 102 may transmit the received content to a different apparatus, so that the different apparatus reproduces the content. Examples of the receiving apparatus 102 include, but not limited to, tablet apparatuses, PCs, televisions, mobile phones, etc. Either a single receiving apparatus 102 or multiple receiving apparatuses 102, as illustrated in FIG. 1, may be connected to the network 103.

The following describes a functional configuration example of the transmission apparatus 101 with reference to FIG. 2A.

An image capturing unit 200 captures images of objects. The image capturing unit 200 includes an image sensor, such as a lens and a complementary metal oxide semiconductor (CMOS), etc. The image sensor converts object images formed by the lens into image signals.

A storage unit 201 acquires and stores video data captured by the image capturing unit 200. The storage unit 201 divides video data captured in the past by the image capturing unit 200 or video data being captured by the image capturing unit 200 at predetermined intervals into segment data and stores the segment data. A method for the division of video data is not limited to the division at predetermined intervals, and any method may be used to divide the video data. By this way, the storage unit 201 stores a plurality of segment data constituting content.

While FIG. 2A illustrates the case in which the transmission apparatus 101 includes the image capturing unit 200, the transmission apparatus 101 may include no image capturing unit 200. In that case, the storage unit 201 may acquire content such as video data from an external apparatus provided outside the transmission apparatus 101, divide the content into predetermined segment data, and then store the segment data.

In a case in which a control unit 204, which will be described below, includes a processor such as a central processing unit (CPU), the storage unit 201 stores programs to be executed by the processor. In the case in which the control unit 204 includes a processor, the storage unit 201 is used to temporarily store parameters to be used when the processor executes a program.

In the present exemplary embodiment, the storage unit 201 stores session identification information, which is used to identify a session established between the transmission apparatus 101 and the receiving apparatus 102, and information indicating whether data transmitted in the session is live video or recorded video such that the information is associated with the session identification information. For example, the storage unit 201 stores information that indicates whether video data to be transmitted to the receiving apparatus 102 is live video data being captured by the image capturing unit 200 or recorded video data having captured completely and stored in a storage medium.

As used herein, the transmission of live video data refers to the act of transmitting to the receiving apparatus 102 segment data constituting a portion of content to be acquired by the transmission apparatus 101 while the transmission apparatus 101 continues to acquire the content. On the other hand, the transmission of recorded video data stored in the storage medium refers to the act of transmitting content to the receiving apparatus 102 after the transmission apparatus 101 has completed the acquisition of the content.

The storage unit 201 includes, for example, a read-only memory (ROM), a random access memory (RAM), and the like. Removable media may be used as the storage unit 201. The storage unit 201 may partially or entirely be an external storage apparatus. The storage unit 201 may include a plurality of storage media.

A generating unit 202 generates metadata (hereinafter, a "playlist 600") of video data stored in the storage unit 201. The playlist 600 is metadata that indicates segment data which the receiving apparatus 102 is allowed to acquire among a plurality of segment data stored in the storage unit 201. The playlist 600 includes, for example, a segment data reproduction time, information on the location of segment data (for example, address information), an order of reproduction of segment data, termination information on segment data, and the like. However, the playlist 600 does not necessarily have to include every information specified above. The playlist 600 is not limited to the information described above. Details of the playlist 600 will be described below with reference to FIGS. 6A and 6B.

A communication unit 203 establishes a session with the receiving apparatus 102 to transmit segment data to the receiving apparatus 102. From the receiving apparatus 102 with which the communication unit 203 has established a session, the communication unit 203 receives a request for the acquisition of a playlist 600 (hereinafter, a "playlist acquisition request"). The communication unit 203 can receive the playlist acquisition request containing an end instruction to give an instruction to end a state in which transmission of segment data to the receiving apparatus 102 is allowed (state in which the session is continued). Alternatively, the communication unit 203 may receive the end instruction independently from the playlist acquisition request. Details of the playlist acquisition request will be described below with reference to FIG. 5.

In response to the received acquisition request, the communication unit 203 transmits the playlist 600 to the receiving apparatus 102. The playlist 600 is metadata indicating segment data that the receiving apparatus 102 is allowed to acquire among a plurality of segment data stored in the storage unit 201. When the communication unit 203 receives the end instruction, the communication unit 203 transmits, in response to the playlist acquisition request, a response (playlist 600) containing termination information indicating that no more segment data is to be added to the playlist 600. The termination information indicates a termination of transmission of segment data to the receiving apparatus.

Further, the communication unit 203 receives a request for the acquisition of segment data (hereinafter, a "segment data acquisition request 700") from the receiving apparatus 102. Then, the communication unit 203 transmits the requested segment data to the receiving apparatus 102.

A timer unit 205 is configured to measure time to determine whether the receiving apparatus 102 has transmitted a playlist acquisition request within a predetermined period of time after the control unit 204 has transmitted an instruction to activate the timer. Timer processing using the timer unit 205 will be described below with reference to FIG. 8.

The control unit 204 controls operations of each unit illustrated in FIG. 2A. For example, the control unit 204 controls the image capturing unit 200 to capture images of objects. The control unit 204 also controls, for example, the storage unit 201 to divide content into segment data and store the segment data. The control unit 204 also controls, for example, the generating unit 202 to generate a playlist 600. The control unit 204 also controls, for example, the communication unit 203 to perform communication.

The control unit 204 may include, for example, a processor such as a CPU. When the control unit 204 includes a processor, the control unit 204 reads and executes a program stored in the storage unit 201 to control the operations of the units of the transmission apparatus 101 illustrated in FIG. 2A.

The following describes a functional configuration example of the receiving apparatus 102 with reference to FIG. 2B.

An operation unit 212 accepts a user operation to start receiving content. A user can operate the operation unit 212 to input an instruction to start receiving content. When the instruction to start receiving content is input, a control unit 210, which will be described below, performs control to transmit a playlist acquisition request to the transmission apparatus 101 via a communication unit 211, which will be described below. The control unit 210 can control the playlist acquisition request such that, for example, the receiving apparatus 102 transmits the playlist acquisition request to the transmission apparatus 101 at predetermined time intervals after the instruction to start receiving content has been input. When the control unit 210 receives the playlist 600 in response to the playlist acquisition request, the control unit 210 selects segment data to be received based on acquisition information 610 contained in the playlist 600 and then transmits a request for the acquisition of the selected segment data. The receiving apparatus 102 receives the segment data in response to the request for the acquisition of the selected segment data. By this way, the receiving apparatus 102 can receive the content.

Further, the operation unit 212 also accepts a user operation to stop receiving the content. A user can operate the operation unit 212 to input an instruction to stop receiving the content. When the instruction to stop receiving the content is input, the control unit 210 performs control to transmit a playlist acquisition request containing an end instruction to the transmission apparatus 101 via the communication unit 211. In response to the playlist transmission request, the receiving apparatus 102 receives the playlist 600 containing termination information. In response to the playlist 600 containing the termination information, the receiving apparatus 102 stops receiving the content.

The communication unit 211 transmits a playlist acquisition request to the transmission apparatus 101. The communication unit 211 may include in the playlist acquisition request an end instruction to end the transmission of segment data to the receiving apparatus 102. Alternatively, the communication unit 211 may transmit the playlist acquisition request and the end instruction separately to the transmission apparatus 101.

Further, the communication unit 211 receives the playlist 600 in response to the playlist acquisition request. The playlist 600 may contain address information to be used to acquire a plurality of segment data constituting the content from the storage unit 201 of the transmission apparatus 101. Further, the playlist 600 may contain reproduction order information indicating the order of reproduction of a plurality of segment data. When the communication unit 211 transmits the end instruction together with the playlist acquisition request, the playlist 600 to be received in response to the playlist acquisition request may contain termination information 620 indicating that no more segment data is to be added to the playlist 600.

Based on what the playlist 600 contains, the communication unit 211 transmits a segment data acquisition request to the transmission apparatus 101. In response to the segment data acquisition request, the communication unit 211 receives segment data from the transmission apparatus 101.

A reproduction unit 206 reproduces the content received by the communication unit 211. A recording processing unit 207 performs processing to record in the storage unit 209 the content received by the communication unit 211. For example, the recording processing unit 207 performs processing to record video data received by the communication unit 211. The recording processing unit 207 also performs processing to record audio data received by the communication unit 211. Alternatively, the receiving apparatus 102 may include no reproduction unit 206 and transmit content data to an external reproduction apparatus connected to the receiving apparatus 102, so that the external reproduction apparatus reproduces the content data.

A setting unit 208 performs setting as to whether the received content is to be recorded. For example, the setting unit 208 switches the receiving apparatus 102 between a recording mode and a non-recording mode. In the recording mode, the receiving apparatus 102 stores in the storage unit 209 video data received by the communication unit 211. In the non-recording mode, on the other hand, the receiving apparatus 102 causes the reproduction unit 206 to reproduce the video data received by the communication unit 211 but does not store the received video data in the storage unit 209. The setting unit 208 stores storage information in the storage unit 209 about whether the receiving apparatus 102 is to record the received content.

The control unit 210 controls operations of the units of the receiving apparatus 102 illustrated in FIG. 2B. The control unit 210 may include, for example, a processor such as a CPU. When the control unit 210 includes a processor, the control unit 210 reads and executes a program stored in the storage unit 209 to control the operations of the units of the receiving apparatus 102 illustrated in FIG. 2B.

When the receiving apparatus 102 is set to the recording mode by the setting unit 208, the storage unit 209 stores the content received by the communication unit 211. Further, when the control unit 210 includes a processor therein such as a CPU, the storage unit 209 stores programs to be executed by the processor. Further, when the control unit 210 includes a processor therein, the storage unit 209 is used to temporarily store parameters to be used when the processor executes the programs.

The storage unit 209 includes, for example, a ROM, RAM, etc. Removable media may also be used as the storage unit 209. The storage unit 209 may partially or entirely be an external storage apparatus. Further, the storage unit 209 may include a plurality of storage media.

Figure 3:
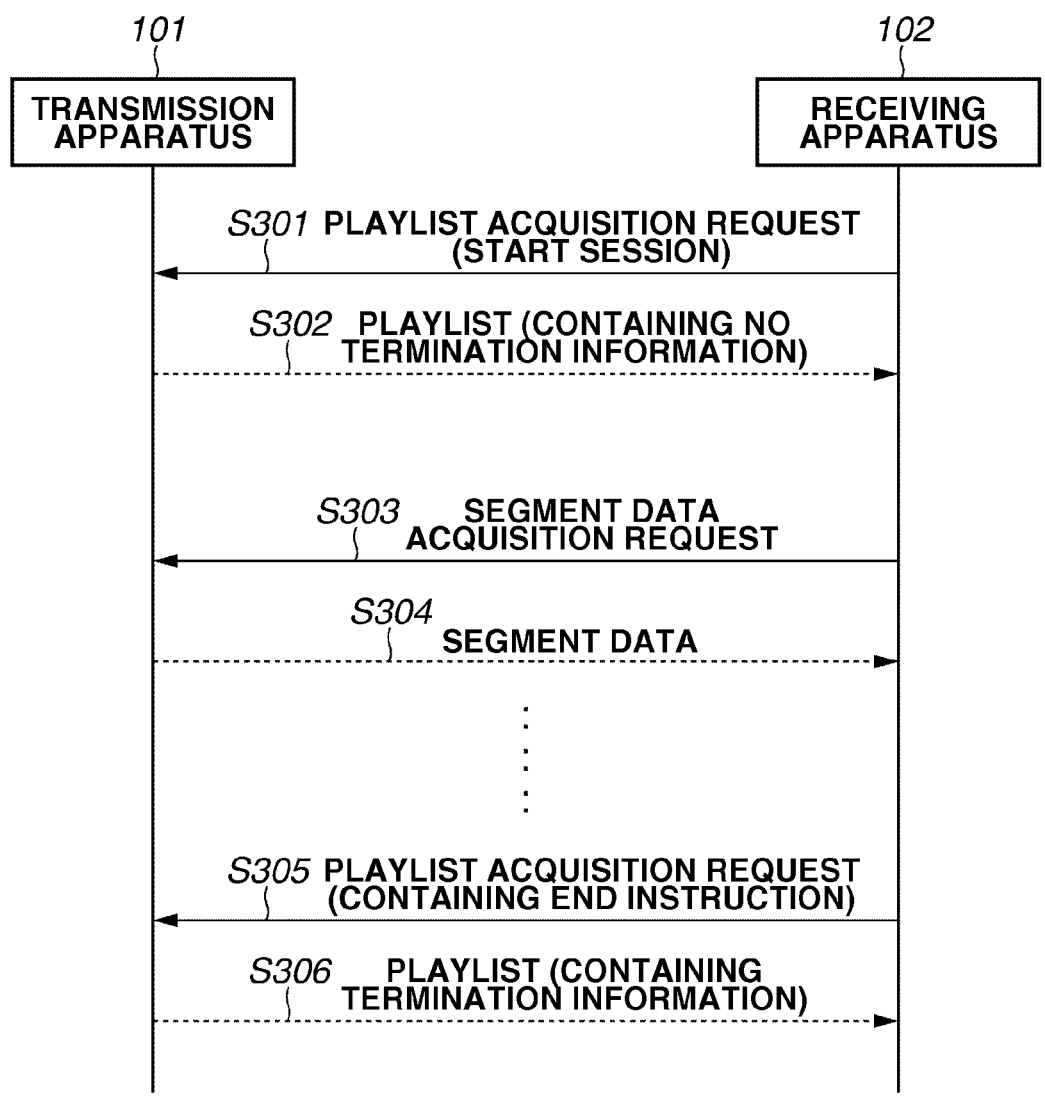
FIG. 3 is a diagram illustrating a data transmission sequence of the transmission system according to the first exemplary embodiment.

The following describes an example of processing to transmit data between the transmission apparatus 101 and the receiving apparatus 102, with reference to FIG. 3.

In step S301 (playlist request receiving step/procedure, playlist request transmission step/procedure), the receiving apparatus 102 transmits a playlist acquisition request to the transmission apparatus 101. The playlist 600 is metadata indicating segment data that the transmission apparatus 101 is allowed to transmit to the receiving apparatus 102. The segment data constitutes a portion of content transmitted by the transmission apparatus 101. The receiving apparatus 102 can receive desired segment data from the transmission apparatus 101 by use of information contained in the playlist 600. Examples of the playlist will be described below with reference to FIGS. 6A and 6B.

In the present exemplary embodiment, the playlist acquisition request contains an identifier for identifying content (e.g., video data). The playlist acquisition request may contain a session identifier for identifying a session established between the transmission apparatus 101 and the receiving apparatus 102. In the present exemplary embodiment, the receiving apparatus 102 generates the session identifier and transmits the generated session identifier to the transmission apparatus 101. Details of the playlist acquisition request will be described below with reference to FIG. 5.

When the transmission apparatus 101 receives the playlist acquisition request containing the session identifier, the transmission apparatus 101 determines whether it is possible to establish a session with the receiving apparatus 102 having transmitted the playlist acquisition request. In step S302 (playlist transmission step/procedure, playlist receiving step/procedure), if it is possible to establish a session with the receiving apparatus 102 having transmitted the playlist acquisition request, then the transmission apparatus 101 transmits the playlist 600 that corresponds to the playlist acquisition request. The case in which it is possible to establish a session with the receiving apparatus 102 refers to a case in which, for example, the number of receiving apparatuses 102 does not exceed the maximum number of receiving apparatuses 102 with which the transmission apparatus 101 can establish a session.

While the present exemplary embodiment describes the case in which the receiving apparatus 102 generates the session identifier, the transmission apparatus 101 may generate a session identifier and notify the receiving apparatus 102 of the session identifier when a session is established. In that case, the transmission apparatus 101 first receives a playlist acquisition request containing no session identifier from the receiving apparatus 102. Then, when the transmission apparatus 101 establishes a session with the receiving apparatus 102 having transmitted the playlist acquisition request containing no session identifier, the transmission apparatus 101 generates a session identifier and notifies the receiving apparatus 102 of the generated session identifier.

Alternatively, the transmission apparatus 101 and the receiving apparatus 102 may exchange a session identifier without including the session identifier in the playlist acquisition request. For example, the transmission apparatus 101 and the receiving apparatus 102 may exchange a session identifier by a command that is different from the playlist acquisition request. Alternatively, the transmission apparatus 101 and the receiving apparatus 102 may exchange a session identifier by use of, for example, a close proximity wireless communication system such as near field communication (NFC). Alternatively, for example, a user may set a session identifier to the transmission apparatus 101 and the receiving apparatus 102 by manual input.

By this way, the session established between the transmission apparatus 101 and the receiving apparatus 102 can be identified. This enables the transmission apparatus 101 to control the connection between the transmission apparatus 101 and the receiving apparatus 102. For example, when the number of receiving apparatuses 102 to receive content from the transmission apparatus 101 has already reached a predetermined maximum number, the transmission apparatus 101 does not transmit content to any new receiving apparatus 102. For example, the transmission apparatus 101 may transmit an error response to the receiving apparatus 102 having made a new playlist acquisition request and may transmit no content to the receiving apparatus 102. For example, the transmission apparatus 101 may identify the session to identify a plurality of receiving apparatuses 102 and to transmit different content to the respective receiving apparatuses 102.

The playlist 600 transmitted from the transmission apparatus 101 to the receiving apparatus 102 in step S302 contains the acquisition information 610 indicating the order of reproduction of segment data, reproduction time, reproduction unit, location information, etc. Details of the playlist 600 will be described below with reference to FIGS. 6A and 6B.

In step S303, the receiving apparatus 102 transmits a request for the acquisition of segment data (segment data acquisition request 700) described in the playlist 600 based on what the playlist 600 received in step S302 contains (segment data request receiving step/procedure, segment data request transmission step/procedure). The segment data acquisition request 700 contains an identifier for the identification of segment data to be requested and the session identifier described above. Details of the segment data acquisition request will be described below with reference to FIG. 7.

In step S304 (segment data transmission step/procedure, segment data reception step/procedure), the transmission apparatus 101 having received the segment data acquisition request 700 transmits corresponding segment data to the receiving apparatus 102. At this time, the transmission apparatus 101 determines whether the segment data acquisition request 700 contains a session identifier. The transmission apparatus 101 determines whether the session identifier is a session identifier that indicates the session established in step S301. Only when the session indicated by the session identifier matches the session established in step S301, the transmission apparatus 101 transmits segment data. When the session indicated by the session identifier does not match the session established in step S301, the transmission apparatus 101 transmits an error response and does not transmit segment data. The receiving apparatus 102 repeats the transmission of the playlist acquisition request and the segment data acquisition request 700 to acquire segments of video data.

In step S305, if a user of the receiving apparatus 102 wishes to end the session, the receiving apparatus 102 transmits the playlist acquisition request containing an end instruction to end the session (end instruction transmission step/procedure, end instruction receiving step/procedure).

In step S306, the transmission apparatus 101 having received the playlist acquisition request containing the end instruction to end the session transmits the playlist 600 containing the termination information (end tag) to the receiving apparatus 102 (termination information transmission step/procedure, termination information receiving step/procedure).

When the receiving apparatus 102 receives the playlist 600 containing the termination information, the receiving apparatus 102 transmits a request for the acquisition of segment data described in front of the termination information of the playlist 600. When the transmission apparatus 101 finishes providing the segment data described in front of the termination information of the playlist 600, the transmission apparatus 101 releases the session between the transmission apparatus 101 and the receiving apparatus 102. Until the transmission apparatus 101 releases the session with the receiving apparatus 102, the transmission apparatus 101 continues to store segment data to be transmitted to the receiving apparatus 102, so that the segment data is ready to be provided to the receiving apparatus 102.

The following describes examples of the playlist acquisition request described with reference to step S301 illustrated in FIG. 3, with reference to FIG. 5.

A playlist acquisition request 500 is an example of the playlist acquisition request that contains no end instruction to end a session. The playlist acquisition request 500 is transmitted in, for example, step S301 illustrated in FIG. 3. "GET/playlistHTTP/1.1" in the playlist acquisition request 500 is a message requesting the acquisition of the playlist.

A session identifier 501 is an identifier for the identification of a session established between the transmission apparatus 101 and the receiving apparatus 102. The session identifier 501 may be, for example, a number string or any arbitrary number. In the example illustrated in FIG. 5, the session identifier 501 is described in an HTTP header. Alternatively, the session identifier may be described in an HTTP Request-Line or an HTTP Body.

Connection information 511 is information that indicates whether the session with the transmission apparatus 101 is to be continued. "Keep-alive" described in the connection information 511 in the playlist acquisition request 500 indicates that the session with the transmission apparatus 101 is to be continued. Alternatively, description of "keep-alive" may be omitted when the session is to be continued.

A playlist acquisition request 510 is an example of the playlist acquisition request containing the end instruction to end the session. The playlist acquisition request 510 is transmitted in, for example, step S305 illustrated in FIG. 3. "Close" described in the connection information 511 in the playlist acquisition request 510 indicates that the session with the transmission apparatus 101 is to be ended. In this example, the connection information 511 ("Connection: Close") that indicates the end of the session plays a role as an end instruction.

In the playlist acquisition requests 500 and 510, an HTTP transfer mode is used as the connection information 511. Alternatively, any other HTTP header may be used as the connection information, or information described in the HTTP Request-Line or the HTTP Body may be used as the connection information.

A playlist acquisition request 520 is an example in which connection information 521, a session identifier 522, and reception mode information 523 on the receiving apparatus 102 are added to the HTTP Request-Line.

A playlist 530 is an example in which connection information 531, a session identifier 532, and reception mode information 523 on the receiving apparatus 102 are added to an HTTP Request Body.

Figure 6A:
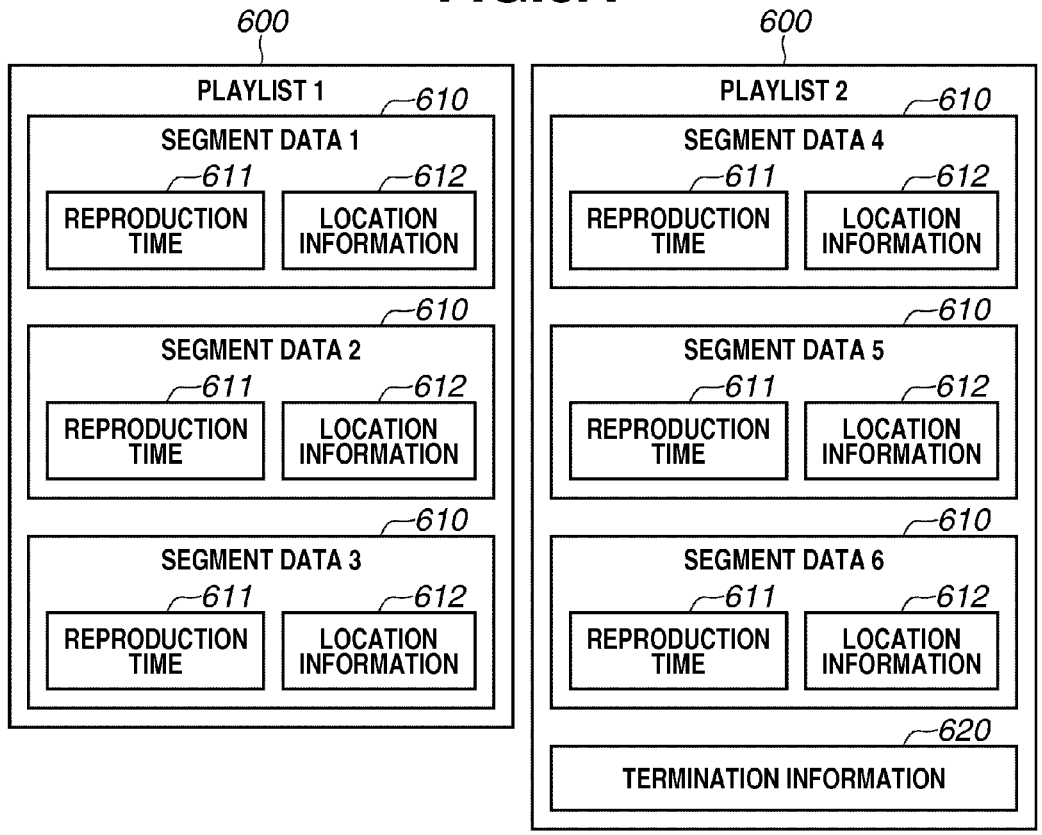
FIGS. 6A and 6B are diagrams illustrating examples of playlists.
Figure 6B:
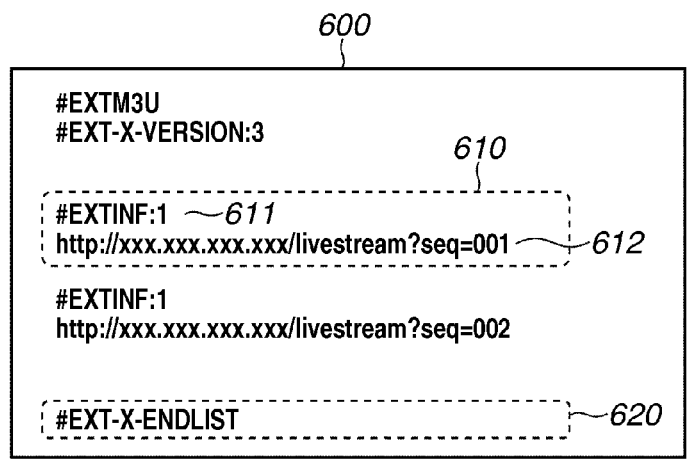

FIGS. 6A and 6B illustrate examples of the playlist 600 (metadata) according to the present exemplary embodiment. FIG. 6A is a conceptual diagram illustrating the configuration of the playlist 600. FIG. 6A illustrates playlists 1 and 2 to be transmitted from the transmission apparatus 101 to the receiving apparatus 102. For example, in response to a first playlist acquisition request from the receiving apparatus 102, the transmission apparatus 101 transmits a first playlist to the receiving apparatus 102. Thereafter, in response to a second playlist acquisition request from the receiving apparatus 102, the transmission apparatus 101 transmits a second playlist to the receiving apparatus 102.

In the case illustrated in FIG. 6A, one acquisition information 610 corresponds to one segment data. In other words, one acquisition information 610 is information used to acquire one segment data among a plurality of segment data generated by dividing content. The playlist 600 can indicate, via the acquisition information 610, segment data that the receiving apparatus 102 is allowed to acquire. Furthermore, the playlist 600 can indicate, via the acquisition information 610, segment data that the transmission apparatus 101 is allowed to transmit. In the case illustrated in FIG. 6A, pieces of acquisition information 610 are described in an order corresponding to an order in which corresponding segment data are to be reproduced.

In the present exemplary embodiment, the playlist 600 may contain multiple pieces of acquisition information 610. Furthermore, the playlist 600 according to the present exemplary embodiment may contain no acquisition information 610. The playlist 600 that contains no acquisition information 610 indicates that there is not any segment data that the receiving apparatus 102 is allowed to acquire. Furthermore, the playlist 600 that contains no acquisition information 610 also indicates that there is not any segment data that the transmission apparatus 101 is allowed to transmit. The cases in which the playlist 600 contains no acquisition information 610 will be described in detail below with reference to FIGS. 4 and 9.

The playlist 600 illustrated on the left hand side in FIG. 6A is an example of the playlist 600 that contains no termination information. The playlist 600 illustrated on the left hand side in FIG. 6A is transmitted in, for example, step S302 illustrated in FIG. 3. This playlist contains the pieces of acquisition information 610 for the acquisition of segment data 1, 2, and 3 among a plurality of segment data constituting the content. Further, the playlist 600 contains no termination information 620. This indicates that the segment data 1, 2, and 3 are to be reproduced in this order. The playlist 600 also indicates that there exist segment data allowed to be transmitted to the receiving apparatus 102 following the segment data 3.

The playlist 600 illustrated on the right hand side in FIG. 6A is an example of the playlist 600 that contains termination information 620. The playlist 600 illustrated on the right hand side in FIG. 6A is transmitted in, for example, step S306 illustrated in FIG. 3. This playlist contains pieces of acquisition information 610 for the acquisition of segment data 4, 5, and 6 among the plurality of segment data constituting the content. The termination information 620 indicates that there exists no segment data to be transmitted to the receiving apparatus 102 following the termination information 620.

When the playlist 600 received by the receiving apparatus 102 contains no termination information 620, the receiving apparatus 102 determines that the transmission apparatus 101 stores segment data to be reproduced following the segment data corresponding to the acquisition information 610 described in the received playlist 600. On the other hand, when the playlist 600 received by the receiving apparatus 102 contains the termination information 620, the receiving apparatus 102 determines that the transmission apparatus 101 does not store segment data to be reproduced following the segment data corresponding to the acquisition information 610 described in the received playlist 600.

The acquisition information 610 to be contained in the playlist 600 may be acquisition information 610 corresponding to segment data that have not been transmitted to the receiving apparatus 102. Alternatively, acquisition information 610 corresponding to segment data that have already been transmitted to the receiving apparatus 102 may be contained in the playlist 600 and then transmitted.

While a single playlist contains acquisition information 610 for acquiring three segment data in the example illustrated in FIG. 6A, the exemplary embodiment of the present invention is not limited to this example. The number and details of the acquisition information 610 to be contained in a single playlist are not particularly limited.

FIG. 6B illustrates a description example of the playlist 600. The playlist 600 illustrated in FIG. 6B is a playlist 600 that contains termination information. Specifically, the playlist 600 illustrated in FIG. 6B corresponds to the playlist 600 illustrated on the right hand side in FIG. 6A. "#EXTINF:1" in FIG. 6B indicates that the number of seconds of reproduction of the segment data is one second. In the example illustrated in FIG. 6B, the location where the segment data is stored is indicated by a uniform resource locator (URL). Further, "#EXT-X-ENDLIST" in FIG. 6B indicates termination of the playlist.

As the foregoing describes, the transmission apparatus 101 can notify the receiving apparatus 102 of the reproduction time of segment data that are allowed to be transmitted, order of reproduction, location, and the like by use of the playlist 600. The receiving apparatus 102 can select desired segment data by use of the playlist 600 and request the transmission apparatus 101 to transmit the selected segment data.

While the examples illustrated in FIGS. 6A and 6B describe the cases in which the playlist 600 contains the acquisition information 610 and the termination information 620, the playlist 600 may also contain other additional information and be transmitted to the receiving apparatus 102.

Figure 7:
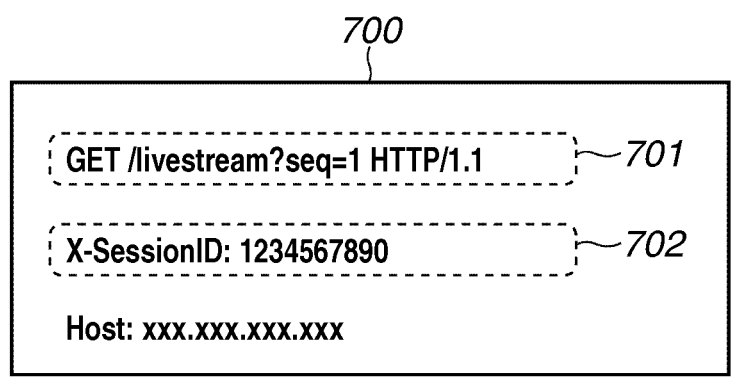
FIG. 7 is a diagram illustrating an example of a segment data acquisition request message.

FIG. 7 illustrates an example of a segment data acquisition request 700. The segment data acquisition request 700 is transmitted from the receiving apparatus 102 to the transmission apparatus 101 in, for example, step S303 illustrated in FIG. 3. A message 701 indicates segment data for which an acquisition request is transmitted. The segment data for which an acquisition request is transmitted corresponds to the acquisition information 610 contained in the playlist 600 received by the receiving apparatus 102. In the present exemplary embodiment, the receiving apparatus 102 generates the message 701 based on location information 612 contained in the playlist 600.

A session identifier 702 is an identifier for identifying a session established between the transmission apparatus 101 and the receiving apparatus 102. The session identifier 702 corresponds to the session identifier 501 described above with reference to FIG. 5. The session identifier 702 and the session identifier 501 are for identifying the same session. The session identifier 702 may be, for example, a number string or an arbitrary value.

Figure 4:
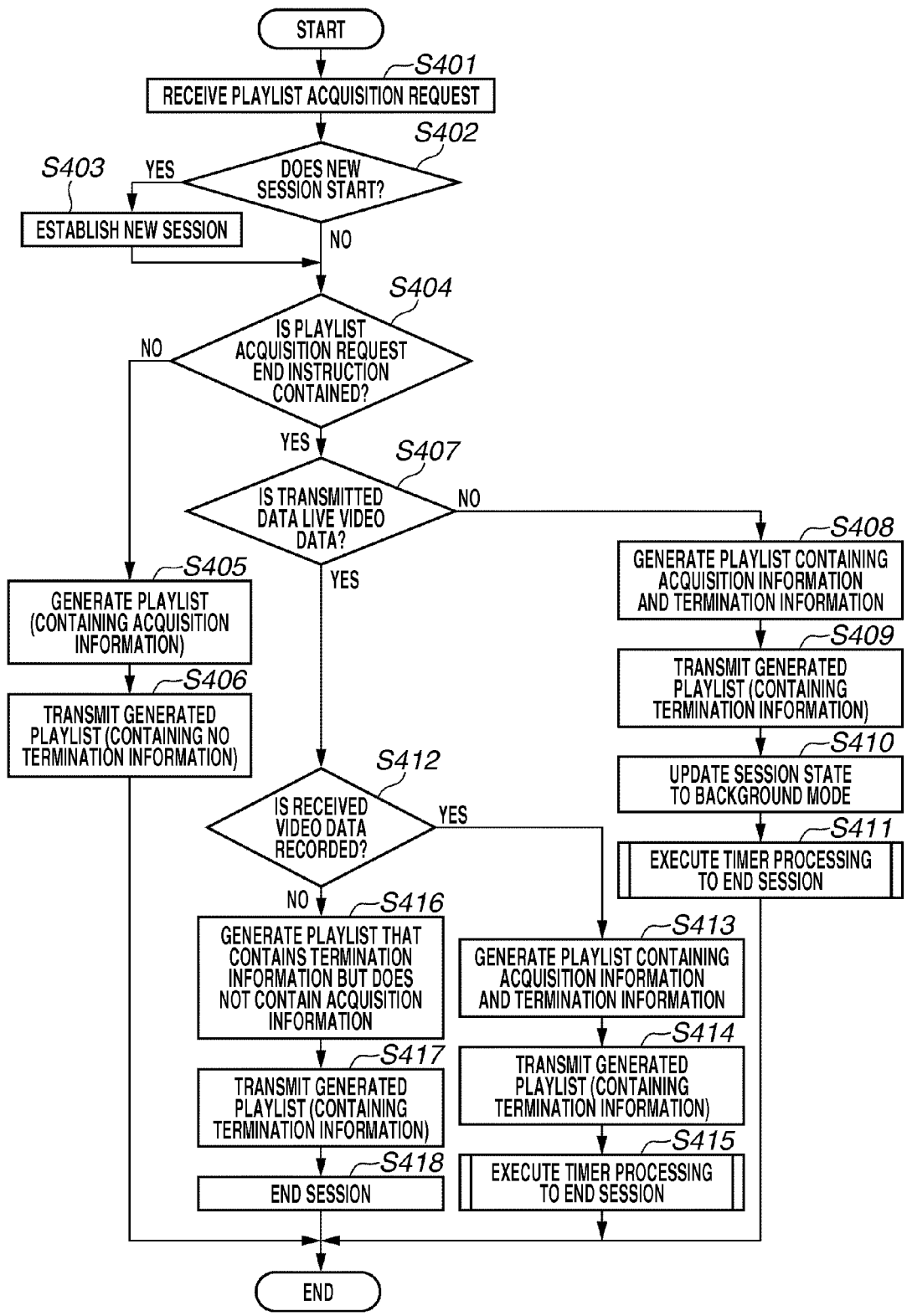
FIG. 4 is a flow diagram illustrating content transmission processing according to the first exemplary embodiment.

The following describes content transmission processing of the transmission apparatus 101 with reference to FIG. 4. In the case in which the control unit 204 of the transmission apparatus 101 includes a processor, the processing flow illustrated in FIG. 4 indicates a program causing the control unit 204 to execute the procedure illustrated in FIG. 4. The processor included in the control unit 204 of the transmission apparatus 101 is a computer and executes the program read from the storage unit 201 included in the transmission apparatus 101. The order of processing is not limited to that as illustrated in the flowchart.

In step S401, the transmission apparatus 101 receives a playlist acquisition request at the communication unit 203 from the receiving apparatus 102. In step S402, the control unit 204 determines whether to establish a new session with the receiving apparatus 102 having transmitted the playlist acquisition request. The control unit 204 determines whether to establish a new session based on whether session identification information contained in the received playlist acquisition request is identical to identification information on a session that has already and currently been established. The identification information on the session that has already and currently been established is stored in the storage unit 201.

In step S402, if the session identification information contained in the playlist acquisition request received from the receiving apparatus 102 matches the identification information stored in the storage unit 201 (NO in step S402), the control unit 204 determines to continue the current session. In that case, the control unit 204 advances the processing to step S404.

On the other hand, if the session identification information contained in the playlist acquisition request received from the receiving apparatus 102 is different from the identification information stored in the storage unit 201 (YES in step S402), then in step S403, the control unit 204 executes processing to establish a new session. In step S403, the control unit 204 additionally stores in the storage unit 201 the session identification information contained in the playlist acquisition request. In the case in which the transmission apparatus 101 generates session identification information, the transmission apparatus 101 generates new session identification information in step S403. By this way, the control unit 204 establishes a new session. After the control unit 204 establishes a new session in step S403, the control unit 204 executes processing of step S404.

In step S404, the control unit 204 determines whether the playlist acquisition request information contains an end instruction to end the session. In the example illustrated in FIG. 5, if the connection information 511 contained in the playlist acquisition request indicates an instruction to end the session (if "Connection:Close"), the control unit 204 determines that the playlist acquisition request information contains an end instruction to end the session. On the other hand, if the connection information 511 contained in the playlist acquisition request indicates an instruction to continue the session (if "Connection:keep-alive"), the control unit 204 determines that the playlist acquisition request information does not contain an end instruction to end the session. Alternatively, the control unit 204 may determine that the playlist acquisition request information does not contain an end instruction to end the session if "Connection:Close" is not described.

If the playlist acquisition request does not contain an end instruction (NO in step S404), then in step S405, the control unit 204 causes the generating unit 202 to generate a playlist 600. In the present exemplary embodiment, in step S405, the generating unit 202 generates a playlist 600 containing acquisition information 610 on segment data that have not been transmitted to the receiving apparatus 102. Alternatively, when the transmission apparatus 101 is not allowed to establish a new session with the receiving apparatus 102, the transmission apparatus 101 may transmit a response containing error information. The case in which the transmission apparatus 101 is not allowed to establish a new session is, for example, a case in which the number of receiving apparatuses 102 with which the transmission apparatus 101 is allowed to establish a session exceeds an upper limit.

When the generating unit 202 generates the playlist 600 in step S405, then in step S406, the control unit 204 controls the communication unit 203 to transmit the generated playlist 600 to the receiving apparatus 102.

On the other hand, in step S404, if the playlist acquisition request contains an end instruction (YES in step S404), then in step S407, the control unit 204 determines whether video data transmitted to the receiving apparatus 102 is live video data.

In the present exemplary embodiment, the storage unit 201 stores information that indicates whether the session established by the transmission apparatus 101 is a session in which live video data being captured by the image capturing unit 200 is transmitted or a session in which video data stored in a storage medium is transmitted. When the transmission apparatus 101 establishes a plurality of sessions with a plurality of receiving apparatuses 102, the storage unit 201 stores, for each session, information that indicates whether the session is a live video data transmission session or a recorded video data transmission session. As used herein, the live video data transmission refers to transmission of video data captured by the image capturing unit 200 while the image capturing unit 200 is capturing images. As used herein, the recorded video data transmission refers to transmission of, for example, video data stored in an external storage apparatus that is externally connected to the transmission apparatus 101, video data stored in a memory card that can be attached to the transmission apparatus 101, etc. The recorded video data transmission may also refer to transmission of video data captured by the image capturing unit 200 and stored in the storage unit 201, etc.

The control unit 204 can determine whether video data transmitted to the receiving apparatus 102 is a live image by reference to the session identification information contained in the playlist acquisition request and information stored in the storage unit 201.

If the transmitted video data is recorded video data (NO in step S407), then in step S408, the control unit 204 causes the generating unit 202 to generate a playlist 600 containing the segment data acquisition information 610 and the termination information 620. In step S409, the control unit 204 transmits the generated playlist 600 to the receiving apparatus 102.

In step S410, after the control unit 204 transmits the playlist 600, the control unit 204 updates the state of the session with the receiving apparatus 102 that is stored in the storage unit 201 to a new session acceptable state (background mode).

The new session acceptable state refers to the state in which a new session is allowed to be established with a second receiving apparatus 102 while a currently established session with a first receiving apparatus 102 is continued. Hereinafter, the new session acceptable state will be referred to as a background mode.

When the session state is the background mode, the second receiving apparatus 102 having established a new session can transmit a playlist acquisition request and a segment data acquisition request to the transmission apparatus 101. Further, the second receiving apparatus 102 can receive a playlist and segment data from the transmission apparatus 101.

When the session state is the background mode, the first receiving apparatus 102 can also transmit a playlist acquisition request and a segment data acquisition request to the transmission apparatus 101. Further, the first receiving apparatus 102 can receive a playlist and segment data from the transmission apparatus 101. However, in transmission of playlists and segment data, transmission of data to the second receiving apparatus 102 is given priority.

In the background mode, when the transmission apparatus 101 receives a data transmission request from the first receiving apparatus 102 and a data transmission request from the second receiving apparatus, the transmission apparatus 101 transmits data to the second receiving apparatus 102 before transmitting data to the first receiving apparatus 102.

In the background mode, data transmission to the first receiving apparatus 102 and data transmission to the second receiving apparatus 102 can be prioritized to exclusively transmit data. This enables data transmission to the first receiving apparatus 102 and the second receiving apparatus 102 while the processing load of the data transmission is maintained at the same level as that in the case of transmitting data only to the first receiving apparatus 102. Thus, even if the number of receiving apparatuses 102 with which the transmission apparatus 101 is allowed to establish a session has already reached the upper limit when the transmission apparatus 101 establishes a session with the first receiving apparatus 102, the transmission apparatus 101 still can transmit data to both the first receiving apparatus 102 and the second receiving apparatus 102.

By this way, the transmission apparatus 101 can receive a playlist acquisition request and a segment data acquisition request from the second receiving apparatus 102 and transmit data to the second receiving apparatus 102 while the transmission apparatus 101 transmits segment data contained in the last playlist to the first receiving apparatus 102. Thus, termination of transmission of content to the first receiving apparatus 102 and initiation of transmission of content to the second receiving apparatus 102 can be conducted continuously.

After the control unit 204 updates the session state to the background mode, in step S411, the control unit 204 activates the timer unit 205 to execute timer processing in order to end the session with the first receiving apparatus 102. As used herein, the timer processing refers to the processing in which, if the transmission apparatus 101 receives no segment data acquisition request from the receiving apparatus 102, with which the transmission apparatus 101 has established the session, within a predetermined period of time since the transmission apparatus 101 transmitted a playlist, the transmission apparatus 101 ends the session with the receiving apparatus 102 with which the transmission apparatus 101 has established the session. Details of the timer processing will be described below with reference to FIG. 8.

While the present exemplary embodiment describes the case in which the playlist 600 containing the termination information is generated in step S408, a playlist 600 containing no termination information may be generated in step S408. In that case, the session with the receiving apparatus 102 is ended by the expiration of the timer in the timer processing described below.

The following describes the processing to be executed when, in step S407, the control unit 204 determines that the transmitted video data is live video data. If the control unit 204 determines that the transmitted video data is live video data (YES in step S407), then in step S412, the control unit 204 determines whether the receiving apparatus 102 records the received video data.

In the present exemplary embodiment, when the receiving apparatus 102 transmits an end instruction to the transmission apparatus 101, the receiving apparatus 102 also notifies the transmission apparatus 101 of, in addition to the end instruction, recording information (recording mode/non-recording mode information) that indicates whether the receiving apparatus 102 records received content. The transmission apparatus 101 can make a determination in step S412 based on the recording information received together with the end instruction. The control unit 204 may determine that the receiving apparatus 102 does not record content if the control unit 204 does not receive recording information that indicates that the receiving apparatus 102 records content.

In the processing to establish a session in step S403, the transmission apparatus 101 may determine whether the receiving apparatus 102 is in the recording mode, in which the receiving apparatus 102 records received video data, or the non-recording mode, in which the receiving apparatus 102 does not record received video data. A method for the determination of the mode is not particularly limited. For example, the transmission apparatus 101 may be set to receive a mode notification from the receiving apparatus 102 in step S403. Alternatively, the transmission apparatus 101 may actively instruct the receiving apparatus 102 to notify the transmission apparatus 101 of the mode, so that the transmission apparatus 101 can determine the mode of the receiving apparatus 102. As the foregoing describes, the communication unit 203 receives from the receiving apparatus 102 the recording information that indicates whether the receiving apparatus 102 records segment data.

If the control unit 204 determines that the receiving apparatus 102 records the received video data (YES in step S412), then in step S413, the control unit 204 causes the generating unit 202 to generate a playlist 600 containing acquisition information 610 and termination information 620.

In step S414, the control unit 204 transmits the playlist generated in step S413 to the receiving apparatus 102. Then, in step S415, the control unit 204 activates the timer unit 205 to execute the timer processing in order to end the session with the receiving apparatus 102.

On the other hand, in step S412, if the control unit 204 determines that the receiving apparatus 102 does not record the received video data (NO in step S412), then in step S416, the control unit 204 causes the generating unit 202 to generate a playlist 600 that contains termination information 620 and does not contain acquisition information 610.

In step S417, the control unit 204 controls the communication unit 203 to transmit the playlist 600 generated in step S416 to the receiving apparatus 102.

In step S418, when the control unit 204 has completed the transmission of the playlist 600 to the receiving apparatus 102, the control unit 204 ends the session with the receiving apparatus 102.

While the foregoing describes the case in which the transmission apparatus 101 transmits video data as content to the receiving apparatus 102, the exemplary embodiment of the present invention is not limited to the case. The exemplary embodiment of the present invention is also applicable to cases in which the transmission apparatus 101 transmits other content such as audio data.

Figure 8:
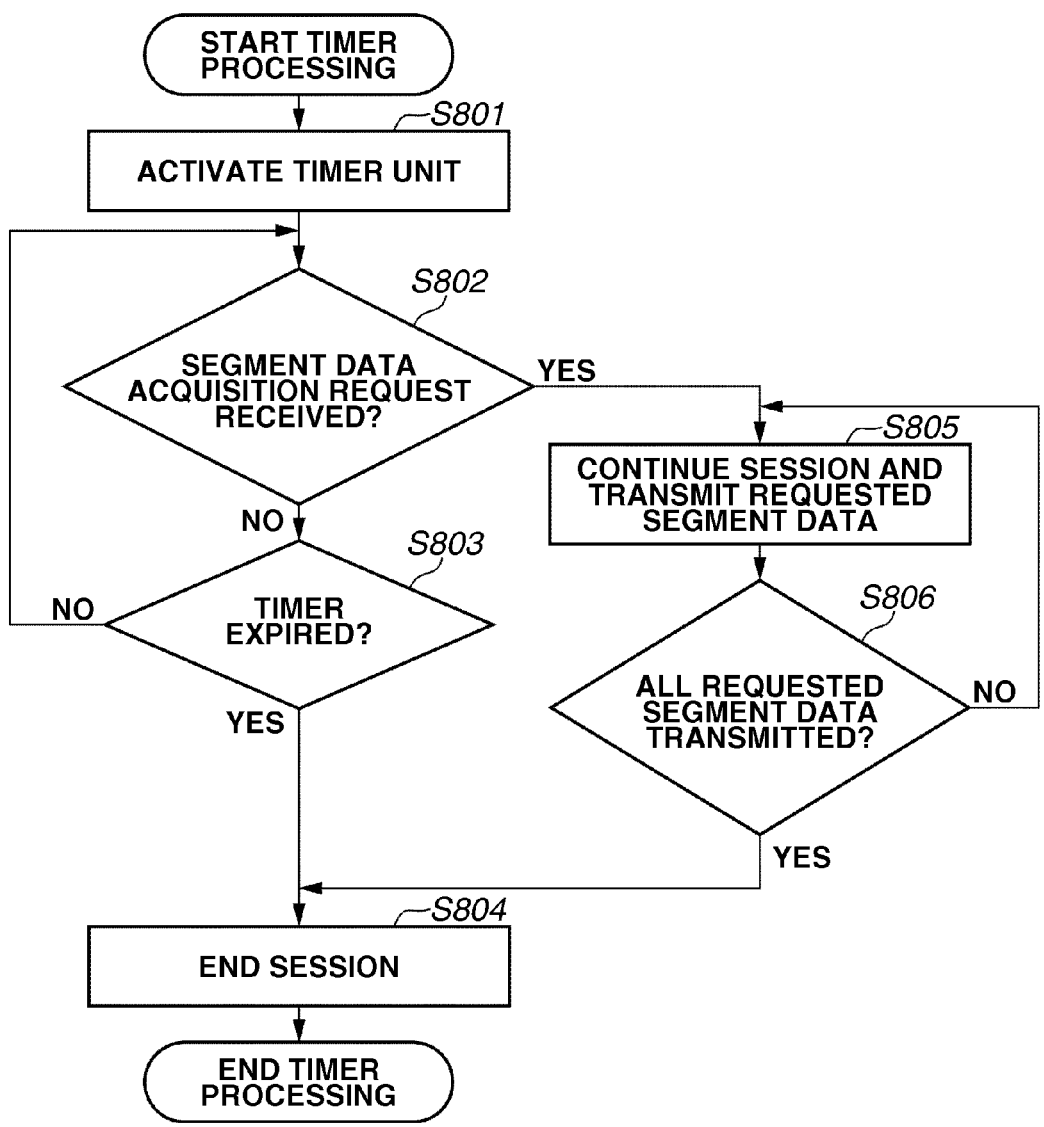
FIG. 8 is a flow diagram illustrating timer processing according to the first exemplary embodiment.

The following describes the timer processing to be executed in steps S411 and S415 illustrated in FIG. 4, with reference to FIG. 8.

First, in step S801, the control unit 204 activates the timer unit 205. Then, in step S802, the control unit 204 determines whether the communication unit 203 has received a segment data acquisition request from the receiving apparatus 102. If the communication unit 203 has not received any segment data acquisition request from the receiving apparatus 102 (NO in step S802), then in step S803, the control unit 204 determines whether the timer has already been expired. If the timer has already been expired (YES in step S803), then in step S804, the control unit 204 ends the session with the receiving apparatus 102 (first receiving apparatus 102). For example, the control unit 204 deletes the identification information on the session with the receiving apparatus 102 that is stored in the storage unit 201, thereby ending the session. On the other hand, if the control unit 204 determines that the timer has not been expired yet (NO in step S803), the control unit 204 repeats the processing illustrated in step S802.

In step S802, if the communication unit 203 has received a segment data acquisition request from the receiving apparatus 102 (YES in step S802), then in step S805, the control unit 204 continues the session with the receiving apparatus 102 and transmits the requested segment data to the receiving apparatus 102. In step S806, the control unit 204 determines whether transmission of all segment data requested by the segment data acquisition request has been completed. If transmission of all requested segment data has not been completed yet (NO in step S806), the control unit 204 repeats the processing in step S805. If transmission of all requested segment data has been completed (YES in step S806), then in step S804, the control unit 204 ends the session with the receiving apparatus 102 (first receiving apparatus 102).

As the foregoing describes, if the communication unit 203 receives no segment data acquisition request within a predetermined period of time since the timer was activated, the control unit 204 can end the session with the receiving apparatus 102 (the first receiving apparatus 102 in the processing in step S411).

FIG. 9 illustrates details of playlist acquisition requests and corresponding playlists 600 to be transmitted in the content transmission processing described above with reference to FIG. 4.

The following describes the case in which the playlist acquisition request transmitted by the receiving apparatus 102 contains no end instruction to end the transmission of content (NO in step S404).

In that case, the transmission apparatus 101 transmits a playlist 600 that contains acquisition information 610 and does not contain termination information 620 as a response to the receiving apparatus 102. Then, in step S406, the transmission apparatus 101 continues the session with the receiving apparatus 102 having transmitted the playlist acquisition request.

In the present exemplary embodiment, the response is transmitted regardless of whether the content transmitted to the receiving apparatus 102 is live content or recorded content. The live content refers to content that the transmission apparatus 101 continues to acquire. For example, the live content is video images being captured by the image capturing unit 200. The recorded content refers to content that was generated in the past and has been acquired completely by the transmission apparatus 101. For example, the recorded content is video data captured in the past by the image capturing unit 200 and stored in the storage unit 201. In the present exemplary embodiment, the response is transmitted regardless of whether the receiving apparatus 102 records received content.

The following describes the case in which the playlist acquisition request to be transmitted by the receiving apparatus 102 contains an end instruction to end the transmission of content (YES in step S404).

In that case, the transmission apparatus 101 in the present exemplary embodiment transmits a playlist 600 containing termination information 620 to the receiving apparatus 102. Whether a playlist contains acquisition information 610 depends on whether content data transmitted by the transmission apparatus 101 is live content and whether the mode of the receiving apparatus 102 is the recording mode/non-recording mode.

The following describes the case in which the transmission apparatus 101 transmits live content. In the case of transmission of live content, the transmission apparatus 101 transmits the playlist 600 and segment data to the receiving apparatus 102 while the transmission apparatus 101 continues to acquire content.

In step S417, if the transmission apparatus 101 transmits live content and the receiving apparatus 102 does not record the received content, the transmission apparatus 101 transmits to the receiving apparatus 102 a playlist 600 that does not contain acquisition information 610 and contains termination information 620. In other words, the transmission apparatus 101 transmits a playlist 600 containing only termination information 620 to the receiving apparatus 102. In step S418, when the transmission apparatus 101 has completed the transmission of the playlist 600, the transmission apparatus 101 ends the session with the receiving apparatus 102 and releases the session so that the transmission apparatus 101 can start a session with a new receiving apparatus 102.

The foregoing enables the transmission apparatus 101 not to transmit segment data acquisition information 610 to the receiving apparatus 102 after the transmission apparatus 101 receives the end instruction. When the receiving apparatus 102 receives the playlist 600 containing no acquisition information 610, the receiving apparatus 102 ends the session with the transmission apparatus 101 without transmitting a segment data acquisition request. Thus, after the transmission apparatus 101 receives the end instruction, the transmission apparatus 101 can promptly end the session with the receiving apparatus 102 having transmitted the end instruction, so that the transmission apparatus 101 can release the session to a new receiving apparatus 102. Accordingly, when the receiving apparatus 102 does not record content, priority can be given to prompt termination of the session.

In step S414, if the transmission apparatus 101 transmits live content and the receiving apparatus 102 records the received content, the transmission apparatus 101 transmits a playlist 600 containing acquisition information 610 and termination information 620 to the receiving apparatus 102. In step S415, after the transmission apparatus 101 transmits the playlist 600, the control unit 204 activates the timer. If the transmission apparatus 101 does not receive a segment data acquisition request within a predetermined period of time, the transmission apparatus 101 ends the session with the receiving apparatus 102 having transmitted the end instruction. On the other hand, if the transmission apparatus 101 receives a segment data acquisition request within a predetermined period of time, the transmission apparatus 101 transmits the requested segment data and thereafter ends the session with the receiving apparatus 102.

The foregoing enables the transmission apparatus 101 not to omit transmission of segment data after the transmission apparatus 101 receives the end instruction if the receiving apparatus 102 records content. Thus, more segment data can be transmitted to and recorded by the receiving apparatus 102, compared with the case in which the receiving apparatus 102 does not record content. Furthermore, data can be transmitted while the real-time property of data transmission is maintained.

Lastly, the following describes a case in which the transmission apparatus 101 receives an end instruction while transmitting recorded content. In that case, in step S409, the transmission apparatus 101 transmits to the receiving apparatus 102 a playlist 600 containing acquisition information 610 and termination information 620. In the present exemplary embodiment, the response is transmitted regardless of whether the receiving apparatus 102 is in the recording mode or in the non-recording mode.

After the transmission apparatus 101 transmits the playlist 600, the transmission apparatus 101 changes the session state to the background mode. This enables the transmission apparatus 101 to establish sessions with the first receiving apparatus 102 having transmitted the end instruction and with a new second receiving apparatus 102. Furthermore, the transmission of content to the second receiving apparatus 102 is set to be given priority over the transmission of content to the first receiving apparatus 102.

The foregoing enables the transmission apparatus 101 to promptly start a session with a new receiving apparatus 102 (second receiving apparatus 102). Furthermore, the transmission apparatus 101 can transmit segment data without omission to the receiving apparatus 102 (first receiving apparatus 102) having transmitted the end instruction.

In the background mode, the transmission of content to the second receiving apparatus 102 is given priority over the transmission of content to the first receiving apparatus 102. Thus, the transmission of content to the first receiving apparatus 102 takes more time compared with the case in which the transmission apparatus 101 establishes a session only with the first receiving apparatus 102. However, when the content distributed to the receiving apparatus 102 is recorded data, the real-time property of data transmission is not required. Thus, the content is transmitted in the background mode, so that the transmission apparatus 101 can promptly establish a session with the second receiving apparatus 102 while transmitting segment data to the first receiving apparatus 102. Since real-time property of data transmission is not required, the playlist may contain no termination information in the case in which the transmission apparatus 101 receives an end instruction. In that case, the first receiving apparatus 102 ends the session by the expiration of the timer in the timer processing.

The present exemplary embodiment has described the case in which whether the receiving apparatus 102 records received content is not taken into consideration when the content transmitted by the transmission apparatus 101 is recorded content. However, even when the transmission apparatus 101 transmits recorded content, whether to include the acquisition information 610 in the playlist 600 may be switched depending on whether the receiving apparatus 102 records received content.

Specifically, when the transmission apparatus 101 transmits recorded content and the receiving apparatus 102 does not record received content, the transmission apparatus 101 transmits a playlist 600 containing no acquisition information 610 in response to a playlist acquisition request containing the end instruction. The receiving apparatus 102 transmits to the transmission apparatus the end instruction to end the transmission of segment data to the receiving apparatus 102. When the transmission apparatus 101 transmits recorded content and the receiving apparatus 102 records the received content, the transmission apparatus 101 transmits a playlist 600 containing acquisition information 610 in response to a playlist acquisition request containing the end instruction.

As the foregoing describes, whether to include acquisition information 610 in a playlist 600 at the time of ending the session can be switched depending on the recording mode of the receiving apparatus 102, regardless of whether the content transmitted by the transmission apparatus 101 is live content or recorded content.

The foregoing configuration enables a receiving apparatus to end the transmission of content at a desired timing in a transmission system in which the content is divided and transmitted as segment data to the receiving apparatus.

Furthermore, in the foregoing configuration, the receiving apparatus transmits to a transmission apparatus an end instruction to end the transmission of content. This enables the transmission apparatus to promptly end the content transmission preparation processing. The content transmission preparation processing refers to, for example, processing for generating segment data to be transmitted to the receiving apparatus, etc.

It may be possible for the transmission apparatus to end the preparation processing when a predetermined period of time has passed since the receiving apparatus and the transmission apparatus were disconnected. However, the transmission apparatus can end the generation of content more promptly if the transmission apparatus ends the preparation processing in response to the end instruction from the receiving apparatus as in the present exemplary embodiment.

When the transmission apparatus is to start a connection with a new receiving apparatus after the preparation processing, if the transmission apparatus can promptly end the preparation processing, the transmission apparatus can promptly shift to a state in which the transmission apparatus can be connected to the new receiving apparatus. For example, after the transmission apparatus ends the transmission of segment data to the receiving apparatus, the transmission apparatus can promptly release the session used to be connected to the receiving apparatus to another receiving apparatus.

The following describes a second exemplary embodiment.

The second exemplary embodiment will describe a case in which the control unit 204 neither determines whether transmitted content by the transmission apparatus 101 is live content nor determines whether the receiving apparatus 102 records the received content.

Description of the configuration of the transmission system according to the present exemplary embodiment is not repeated because the configuration is the same as that described in the first exemplary embodiment with reference to FIG. 1. The functional configurations of the transmission apparatus 101 and the receiving apparatus 102 according to the present exemplary embodiment are also the same as those of the first exemplary embodiment described with reference to FIGS. 2A and 2B. In the present exemplary embodiment, the transmission apparatus 101 may include no timer unit 205. In the present exemplary embodiment, the receiving apparatus 102 may include no recording processing unit 207.

The following describes the content transmission processing to be executed by the transmission apparatus 101 in the present exemplary embodiment, with reference to FIG. 10. In a case in which the control unit 204 of the transmission apparatus 101 includes a processor therein, the flow of processing illustrated in FIG. 10 indicates a program for causing the control unit 204 to execute the procedure illustrated in FIG. 10. The processor included in the control unit 204 of the transmission apparatus 101 is a computer and executes the program read from the storage unit 201 included in the transmission apparatus 101.

Description of the processing from steps S1001 to S1004 illustrated in FIG. 10 is not repeated because the processing is the same as the processing from steps S401 to S404 described in the first exemplary embodiment with reference to FIG. 4.

In step S1004, if a playlist acquisition request contains no end instruction (NO in step S1004), then in step S1005, the control unit 204 causes the generating unit 202 to generate a playlist 600. In the present exemplary embodiment, the generating unit 202 generates a playlist 600 containing acquisition information 610 on segment data that has not been transmitted to the receiving apparatus 102. Alternatively, when the transmission apparatus 101 is not allowed to establish a new session with the receiving apparatus 102, the transmission apparatus 101 may transmit a response containing error information. The case in which the transmission apparatus 101 is not allowed to establish a new session is, for example, a case in which the number of receiving apparatuses 102 with which the transmission apparatus 101 is allowed to establish a session exceeds an upper limit.

After the generating unit 202 generates the playlist 600 in step S1005, the control unit 204 controls the communication unit 203 to transmit the generated playlist 600 to the receiving apparatus 102 in step S1006.

On the other hand, in step S1004, if the playlist acquisition request contains an end instruction (YES in step S1004), then in step S1007, the control unit 204 causes the generating unit 202 to generate a playlist 600 that contains termination information 620 and does not contain acquisition information 610.

In step S1008, the control unit 204 controls the communication unit 203 to transmit the playlist 600 generated in step S1007 to the receiving apparatus 102. In step S1009, when the control unit 204 has completed the transmission of the playlist 600 to the receiving apparatus 102, the control unit 204 ends the session with the receiving apparatus 102.

While the foregoing describes the case in which the transmission apparatus 101 transmits video data as content to the receiving apparatus 102, the exemplary embodiment of the present invention is not limited to the case. The exemplary embodiment of the present invention is also applicable to cases in which the transmission apparatus 101 transmits other content such as audio data.

With regard to the content transmission processing described with reference to FIG. 10, FIG. 11 illustrates details of the playlist acquisition requests and corresponding playlists 600 to be transmitted.

If the playlist acquisition request received from the receiving apparatus 102 contains no end instruction (NO in step S1004), the transmission apparatus 101 transmits a playlist 600 that contains acquisition information 610 and does not contain termination information 620 as a response, to the receiving apparatus 102. In that case, the transmission apparatus 101 transmits, for example, the playlist 600 illustrated on the left hand side in FIG. 6A. The transmission apparatus 101 continues the session with the receiving apparatus 102 even after the transmission apparatus 101 transmits the playlist 600.

On the other hand, if the playlist acquisition request received from the receiving apparatus 102 contains an end instruction (YES in step S1004), the transmission apparatus 101 transmits a playlist 600 that does not contain acquisition information 610 and contains termination information 620 as a response, to the receiving apparatus 102. In that case, the transmission apparatus 101 transmits, for example, the playlist 600 illustrated on the right hand side in FIG. 6A. After the transmission apparatus 101 transmits the playlist 600, the transmission apparatus 101 ends the session with the receiving apparatus 102.

The foregoing enables the transmission apparatus 101 not to transmit segment data acquisition information 610 to the receiving apparatus 102 after the transmission apparatus 101 receives the end instruction. When the receiving apparatus 102 receives the playlist 600 containing no acquisition information 610, the receiving apparatus 102 ends the session with the transmission apparatus 101 without transmitting a segment data acquisition request. Thus, after the transmission apparatus 101 receives the end instruction, the transmission apparatus 101 can promptly end the session with the receiving apparatus 102 having transmitted the end instruction, so that the transmission apparatus 101 can release the session to a new receiving apparatus 102. This enables prompt termination of the session.

The foregoing enables a receiving apparatus to end the transmission of content at a desired timing in a transmission system in which the content is divided and transmitted as segment data to the receiving apparatus.

According to an aspect of the exemplary embodiments of the present invention, a receiving apparatus can end the transmission of content at a desired timing in a transmission system in which the content is divided and transmitted as segment data to the receiving apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-250187 filed Nov. 14, 2012, which is hereby incorporated by reference herein in its entirety.

What is claimed is:

1. A transmission apparatus comprising:
   one or more hardware processors; and
   a memory for storing instructions to be executed by the one or more hardware processors,
   wherein when the instructions stored in the memory are executed by the one or more hardware processors, the one or more hardware processors function as:
   an establishing unit configured to establish a session with a receiving apparatus;
   a receiving unit configured to receive, from the receiving apparatus with which the session is established by the establishing unit, a playlist request for a playlist containing address information of each of one or more segments obtained by dividing a content;
   a determination unit configured to determine whether the playlist request received by the receiving unit from the receiving apparatus contains a termination instruction to terminate the session with the receiving apparatus;
   a transmission unit configured to:
      (i) transmit to the receiving apparatus, in a case where the determination unit determines that the playlist request received by the receiving unit from the receiving apparatus does not contain the termination instruction, a first playlist that contains address information of each of one or more segments obtained by dividing a content and does not contain termination notification to notify the receiving apparatus of a segment to be transmitted to the receiving apparatus later than a segment represented by the transmitted playlist does not exist, and
      (ii) transmit to the receiving apparatus, in a case where the determination unit determines that the playlist request received by the receiving unit from the receiving apparatus contains the termination instruction, a second playlist that contains the termination notification to notify the receiving apparatus of a segment to be transmitted to the receiving apparatus later than a segment represented by the transmitted playlist does not exist; and
   a processing unit configured to perform termination processing to terminate the session with the receiving apparatus after transmitting the second playlist by the transmission unit.

2. The transmission apparatus according to claim 1, wherein, when the determination unit determines that the playlist request from the receiving apparatus does not contain the termination instruction, the transmission unit transmits, to the receiving apparatus, the first playlist that contains reproduction order information indicating an order of reproduction of the plurality of segments and does not contain the termination notification, and, when the determination unit determines that the playlist request from the receiving apparatus contains the termination instruction, the transmission unit transmits, to the receiving apparatus, the second playlist that does not contain the reproduction order information and contains the termination notification.

3. The transmission apparatus according to claim 1, further comprising an acquisition unit configured to acquire content,
wherein, in response to receiving of the playlist request while the acquisition unit continues acquiring the segment, the transmission unit transmits, to the receiving apparatus, a playlist indicating one or more segments that correspond to a portion of the content to be acquired by the acquisition unit.

4. The transmission apparatus according to claim 1, further comprising an acquisition unit configured to acquire content,
wherein, in response to receiving of the playlist request after the acquisition unit has completed the acquisition of the content, the transmission unit transmits, to the receiving apparatus, a playlist indicating one or more segments that correspond to a portion of the content acquired by the acquisition unit.

5. The transmission apparatus according to claim 1, wherein the receiving unit receives, from the receiving apparatus, recording information indicating whether the receiving apparatus records the received segment, and
wherein, when the receiving unit receives a playlist request which contains the termination instruction, and does not receive the recording information indicating that the receiving apparatus records the received segment, the transmission unit transmits, to the receiving apparatus, the second playlist that does not contain address information of one or more segments corresponding to the content, and, when the receiving unit receives the playlist request which contains the termination instruction, and also receives the recording information indicating that the receiving apparatus records the received segment, the transmission unit transmits, to the receiving apparatus, the second playlist that contains the address information of one or more segments corresponding to the content.

6. The transmission apparatus according to claim 1, wherein, in a case where (i) the receiving unit receives the playlist request containing the termination instruction from the receiving apparatus with which the session has been established and (ii) the receiving unit does not receive the request for acquisition of the segment from the receiving apparatus within a predetermined period of time after the transmission of the second playlist that contains the termination notification and address information to be used to acquire the segment, the processing unit performs the termination processing to terminate the session with the receiving apparatus.

7. The transmission apparatus according to claim 1, further comprising:
a segment determination unit configured to determine, based on a state of the receiving apparatus, address information of one or more segments to be contained in the second playlist which is transmitted to the receiving apparatus in response to the playlist request that contains the termination instruction, and
a generation unit configured to generate the second playlist that contains the termination notification and the address information of the one or more segments determined by the segment determination unit.

8. The transmission apparatus according to claim 7, wherein the state of the receiving apparatus contains a first state that the receiving apparatus records segments received from the transmission apparatus and a second state that the receiving apparatus displays image based on segments received from the transmission apparatus and does not record the segments received from the transmission apparatus.

9. A receiving apparatus comprising:
one or more hardware processors; and
a memory for storing instructions to be executed by the one or more hardware processors,
wherein when the instructions stored in the memory are executed by the one or more hardware processors, the one or more hardware processors function as:
an establishing unit configured to establish a session, with a transmission apparatus, for communicating one or more segments obtained by dividing content;
a determination unit configured to determine whether the session established by the establishing unit with the transmission apparatus is to be terminated;
a transmission unit configured to:
(i) transmit, to the transmission apparatus, a first playlist request that contains a termination instruction to terminate the session with the transmission apparatus in a case where the determination unit determines that the session established by the establishing unit with the transmission apparatus is to be terminated, and
(ii) transmit, to the transmission apparatus, a second playlist request which does not contain the termination instruction in a case where the determination unit does not determine that the session established by the establishing unit with the transmission apparatus is to be terminated, wherein a playlist, transmitted from the transmission apparatus in response to the playlist request, contains address information of each of one or more segments obtained by dividing content; and
a processing unit configured to perform termination processing to terminate the session with the transmission apparatus after receiving a playlist from the transmission apparatus in a case where the playlist, received from the transmission apparatus in response to transmitting the first playlist request, contains termination notification to notify the receiving apparatus of a segment to be transmitted to the receiving apparatus later than a segment represented by the transmitted playlist does not exist.

10. The receiving apparatus according to claim 9, wherein, when the transmission unit transmits the second playlist request, the receiving unit receives, from the transmission apparatus, the playlist that contains address information to be used to acquire the segment and does not contain the termination notification, and, when the transmission unit transmits the first playlist request, the receiving unit receives, from the transmission apparatus, the playlist that does not contain the address information and contains the termination notification.

11. The receiving apparatus according to claim 9, wherein the processing unit performs the termination processing to terminate the session with the transmission apparatus after acquiring a segment in a case where the playlist, received from the transmission apparatus in response to the first playlist request, contains both of the termination notification to notify the receiving apparatus of a segment to be transmitted to the receiving apparatus later than a segment indicated in the playlist is not exist and address information of the segment acquirable by the receiving apparatus.

12. A method comprising:
establishing a session with a receiving apparatus;

receiving, from the receiving apparatus with which the session is established by the establishing, a playlist request for a playlist containing address information of each of one or more segments obtained by dividing a content;

determining whether the playlist request received by the receiving from the receiving apparatus contains a termination instruction to terminate the session with the receiving apparatus;

transmitting to the receiving apparatus, in a case where the determining determines that the playlist request received by the receiving from the receiving apparatus does not contain the termination instruction, a first playlist that contains address information of each of one or more segments obtained by dividing a content and does not contain termination notification to notify the receiving apparatus of a segment to be transmitted to the receiving apparatus later than a segment represented by the transmitted playlist does not exist;

transmitting to the receiving apparatus, in a case where the determining determines that the playlist request received by the receiving from the receiving apparatus contains the termination instruction, a second playlist that contains the termination notification to notify the receiving apparatus of a segment to be transmitted to the receiving apparatus later than a segment represented by the transmitted playlist does not exist; and performing termination processing to terminate the session with the receiving apparatus after the transmitting of the second playlist.

13. A method comprising:

establishing a session, with a transmission apparatus, for communicating one or more segments obtained by dividing content;

determining whether the session established by the establishing with the transmission apparatus is to be terminated;

transmitting, to the transmission apparatus, a first playlist request that contains a termination instruction to terminate the session with the transmission apparatus in a case where the determining determines that the session established by the establishing with the transmission apparatus is to be terminated; and transmitting, to the transmission apparatus, a second playlist request which does not contain the termination instruction in a case where the determining does not determine that the session established by the establishing with the transmission apparatus is to be terminated, wherein a playlist, transmitted from the transmission apparatus in response to the playlist request, contains address information of each of one or more segments obtained by dividing content; and performing termination processing to terminate the session with the transmission apparatus after receiving a playlist from the transmission apparatus in a case where the playlist, received from the transmission apparatus in response to transmitting the first playlist request, contains termination notification to notify the receiving apparatus of a segment to be transmitted to the receiving apparatus later than a segment represented by the transmitted playlist does not exist.

14. A non-transitory computer readable storage medium storing a program for causing a computer to perform a procedure comprising:

an establishment procedure of establishing a session with a receiving apparatus;

a reception procedure of receiving, from the receiving apparatus with which the session is established by the establishing, a playlist request for a playlist containing address information of each of one or more segments obtained by dividing a content;

a determination procedure of determining whether the playlist request received by the receiving from the receiving apparatus contains a termination instruction to terminate the session with the receiving apparatus;

a transmission procedure of transmitting to the receiving apparatus, in a case where the determining determines that the playlist request received by the receiving from the receiving apparatus does not contain the termination instruction, a first playlist that contains address information of each of one or more segments obtained by dividing a content and does not contain termination notification to notify the receiving apparatus of a segment to be transmitted to the receiving apparatus later than a segment represented by the transmitted playlist does not exist;

a transmission procedure of transmitting to the receiving apparatus, in a case where the determining determines that the playlist request received by the receiving from the receiving apparatus contains the termination instruction, a second playlist that contains the termination notification to notify the receiving apparatus of a segment to be transmitted to the receiving apparatus later than a segment represented by the transmitted playlist does not exist; and a termination procedure of performing termination processing to terminate the session with the receiving apparatus after the transmitting of the second playlist.

15. A non-transitory computer readable storage medium storing a program for causing a computer to perform a procedure comprising:

an establishment procedure of establishing a session, with a transmission apparatus, for communicating one or more segments obtained by dividing content;

a determination procedure determining whether the session established by the establishing with the transmission apparatus is to be terminated;

a transmission procedure of transmitting, to the transmission apparatus, a first playlist request that contains a termination instruction to terminate the session with the transmission apparatus in a case where the determining determines that the session established by the establishing with the transmission apparatus is to be terminated; and a transmission procedure of transmitting, to the transmission apparatus, a second playlist request which does not contain the termination instruction in a case where the determining does not determine that the session established by the establishing with the transmission apparatus is to be terminated, wherein a playlist, transmitted from the transmission apparatus in response to the playlist request, contains address information of each of one or more segments obtained by dividing content; and a termination procedure of performing termination processing to terminate the session with the transmission apparatus after receiving a playlist from the transmission apparatus in a case where the playlist, received from the transmission apparatus in response to transmitting the first playlist request, contains termination notification to notify the receiving apparatus of a segment to be transmitted to the receiving apparatus later than a segment represented by the transmitted playlist does not exist.

* * * * *